Figure 1:
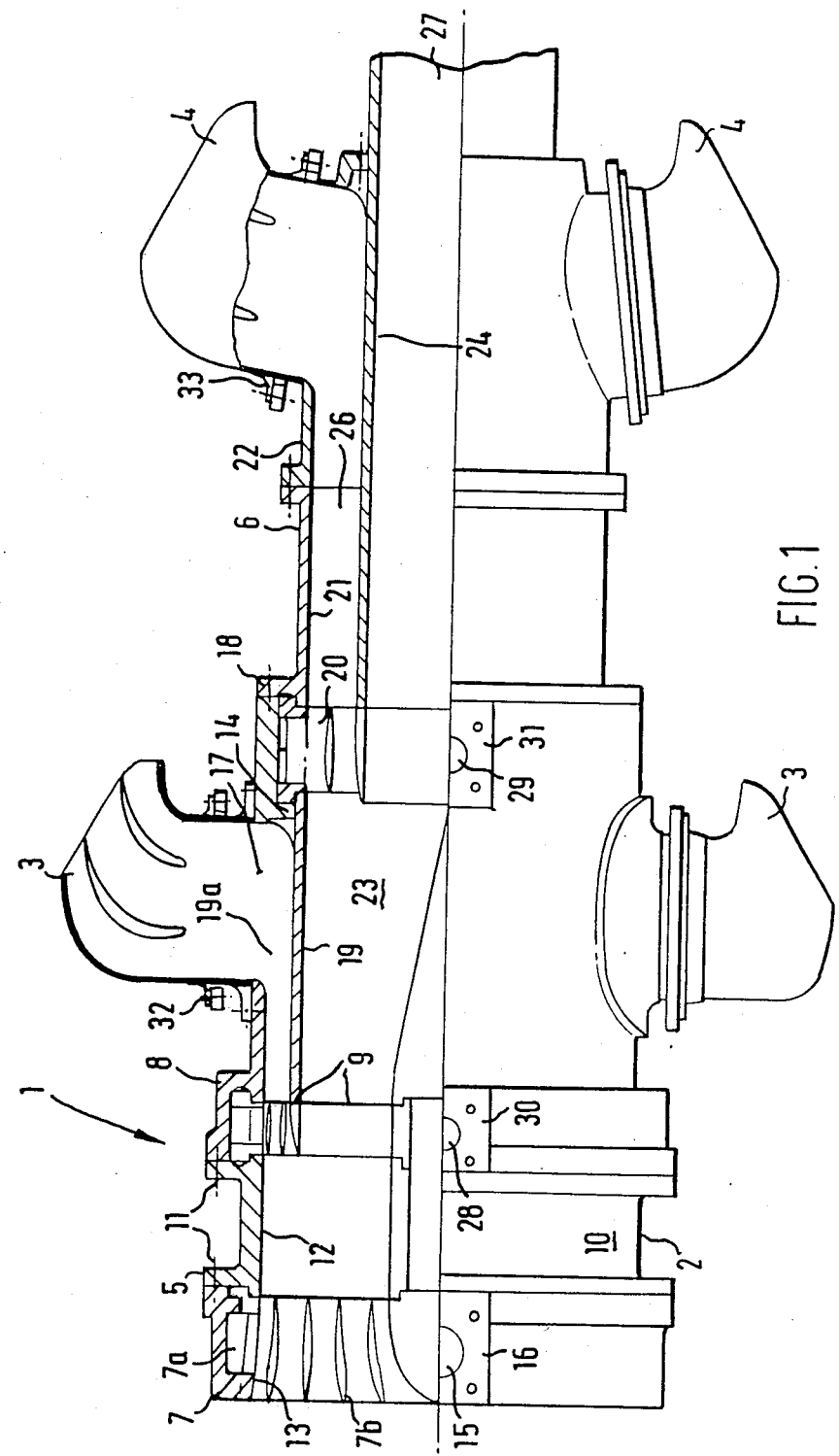

United States Patent [19]

Angel

[11] Patent Number: 4,742,709
[45] Date of Patent: May 10, 1988

[54] POWERPLANT SIMULATORS FOR AIRCRAFT

[75] Inventor: Robert G. A. Angel, Farnham, United Kingdom

[73] Assignee: British Aerospace PLC, London, England

[21] Appl. No.: 58,369

[22] Filed: Jun. 5, 1987

[30] Foreign Application Priority Data

Jun. 5, 1986 [GB] United Kingdom ............... 8613641

[51] Int. Cl.4 .......................................... G01M 15/00
[52] U.S. Cl. ................................................. 73/117.1
[58] Field of Search .................. 73/117.1, 117.4, 865.6

[56] References Cited

U.S. PATENT DOCUMENTS 3,525,474 8/1970 Von Ohain et al. .
4,034,604 7/1977 Decher et al. ................. 73/117.4 X

FOREIGN PATENT DOCUMENTS 299420 10/1928 United Kingdom .
808514 2/1959 United Kingdom ............... 73/117.1

Primary Examiner—Jerry W. Myracle
Attorney, Agent, or Firm—Cushman, Darby & Cushman

[57] ABSTRACT

A gas turbine powerplant simulator arrangement includes an engine body 2, an intake 13 and exhaust nozzles 3, 4. An air intake flow duct 12 extends from the air intake 13. There is a first primary injector 7, 7a adjacent the intake 13 and includes a primary drive gas inlet 15 connectible to a gas supply source. The flow duct 12 includes an excess flow discharge duct 27 and a balance flow passageway 19a communicating a second primary injector 9 located intermediate the air intake 13 and the adjacent exhaust nozzle 3. The second injector 9 includes its own primary drive gas inlet 28 connectible to an independent gas supply source. The injectors 7, 7a and 9 extend across the full flow cross-section of the duct 12.

6 Claims, 2 Drawing Sheets

POWERPLANT SIMULATORS FOR AIRCRAFT

This invention relates to powerplant simulators for aircraft. More particularly it relates to simulators which reproduce, to model scale, intake and exhaust flows associated with powerplant of the gas turbine type.

Powerplant simulators are used in connection with wind tunnel testing of aircraft and, for satisfactory results to be obtained, the simulators should exhibit correct inlet flow with correct exhaust pressures. Certain known powerplant simulators, however, do not achieve the desired pressure ratios concurrently and consequently the modelled 'power on' effects frequently do not reproduce accurately those at 'full scale'.

It it therefore one object of the present invention to overcome this shortcoming.

Known powerplant simulators are dependent on the use of turbine powered simulator units which are designed to reproduce, to model scale, the inlet and exhaust flows of medium-to-high bypass ratio powerplants in wind tunnels. These units, which typically comprise an axial fan driven by an axial turbine on a common shaft, are extremely expensive yet have a comparatively short life and may undesirably require to be closely monitored by computer throughout their operating cycle.

It is therefore a further object of the present invention to provide a powerplant simulator arrangement which obviates the need for a turbine powered simulator unit.

According to one aspect of the present invention there is provided a gas turbine powerplane simulator comprising an engine body having a fluid flow intake means connected for fluid flow with at least one exhaust nozzle by way of a duct; a first injector stage for injecting primary gas from a primary gas source into said duct so as to induce a flow of secondary gas or air from said intake means into said duct to mix with said primary gas; and at least one second injector stage connected to said duct at a position intermediate the first stage and said at least one exhaust nozzle for injecting primary gas from a primary gas source into said duct; wherein the said gas sources are mutually independent of one another.

Preferably, the second injector stage is effective to inject primary gas across the whole flow cross-section of said duct.

According to another, independent aspect of the present invention, there is provided a gas turbine powerplant simulator comprising an engine body having a fluid flow intake means connected for fluid flow with at least one exhaust nozzle by way of a duct; a first injector stage for injecting primary gas from a primary gas source into said duct so as to induce a flow of secondary gas or air from said intake means into said duct to mix with said primary gas; and at least one second injector stage connected to said duct at a position intermediate the first stage and said at least one exhaust nozzzle for injecting primary gas from a primary gas source into said duct; wherein the second injector stage is effective to inject primary gas across the whole flow cross-section of said duct.

Figure 2:
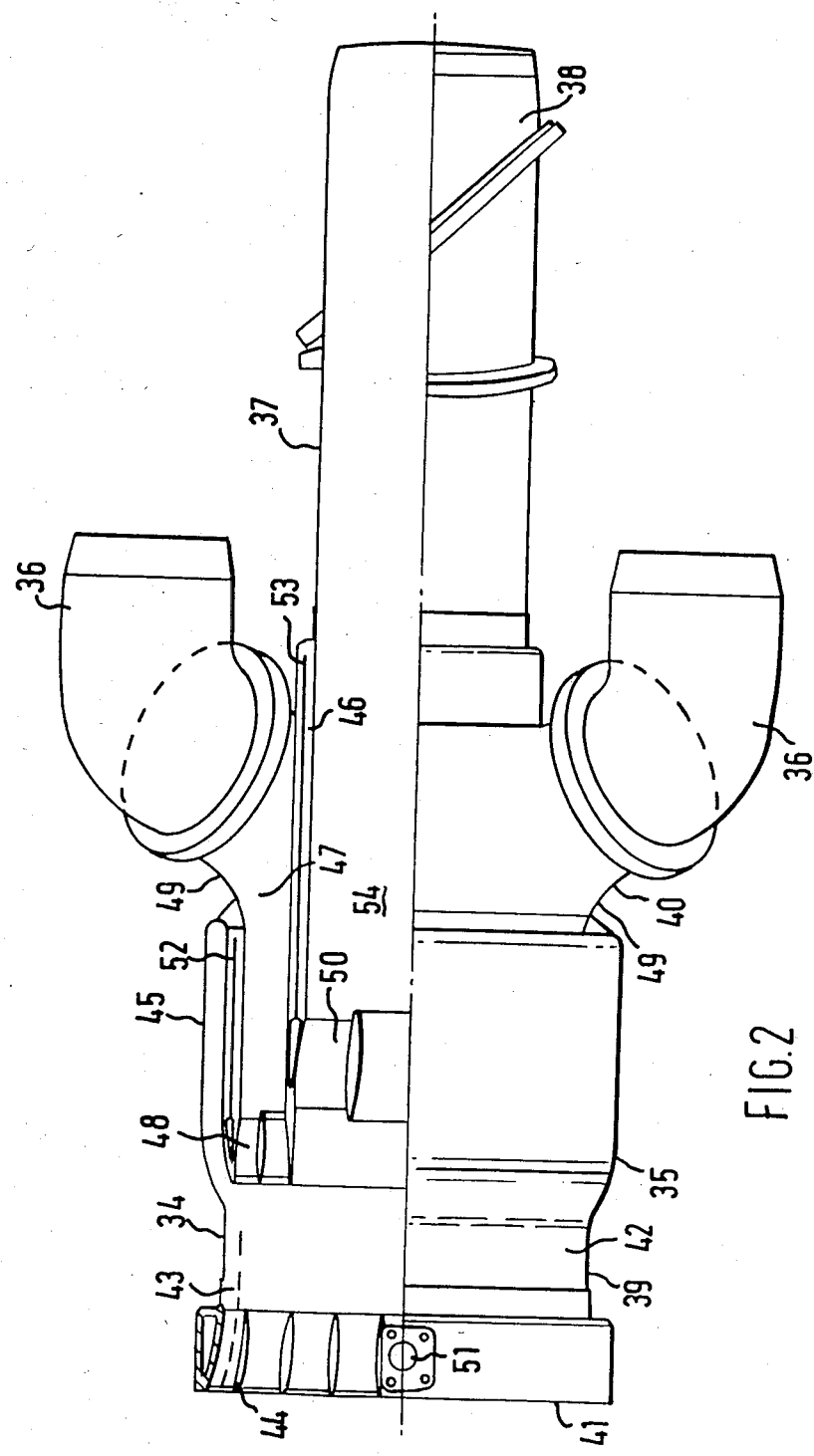

The invention will now be described, purely by way of example, with reference to the accompanying drawings, in which:

FIG. 1 illustrates, in plan view and partly in section to one side of the longitudinal centre line, a powerplant simulator of the well-known vectored thrust type according to the invention, and FIG. 2 illustrates, in plan view and partly in section to one side of the longitudinal centre line, an alternative powerplant simulator arrangement of the vectored thrust type.

Referring first to FIG. 1, it illustrates a powerplant simulator 1 of a vectored thrust engine well-known in the art, the simulator including a representative main engine body 2 communicating with forward and rearward pairs of vectorable thrust nozzles 3 and 4, respectively. The external form of the simulator, while not truly representative of a full scale powerplant, is configured to fit as closely as possible within the powerplant envelope.

The main engine body 3 comprises a hollow forward body assembly 5 and a hollow rearward body assembly 6. The forward assembly 5 includes a first primary injector stage 7, a body portion 8 including a second primary injector stage 9 and an intermediate body portion 10 secured by bolted attachments 11 to the stage 7 and the body portion 8. Internally, the forward assembly 5 defines an intake flow duct 12 extending rearwardly from a air intake opening 13 for secondary air flow provided in the stage 7 and terminating in an internal annular flange 14. The first primary ejector stage 7 includes an annular primary flow injector 7a, around the secondary air intake opening 13, includes cascade elements 7b and is in fluid flow communication with the air intake duct 12.

Primary inpur flow of drive gas enters the injector stage 7 by means of a port 15 located within a mounting pad 16, which pad provides attachment means for mounting the simulator within a wind tunnel. The body portion 8 includes fluid outlet openings 17 co-incident with the thrust nozzles 3.

The rearward extremity of the body portion 8 provides an attachment face for locating the rearward assembly 6 by means of a bolted attachment flange 18. This rearward assembly 6 is of smaller diameter than the forward assembly 5. The assembly 6 includes a forwrad intake duct 19 which extends forwardly to the injector stage 9, a third primary injector stage 20, an intermediate body portion 21 and a rearward body portion 22 which terminates rarwardly adjacent the thrust nozzles 4. The forwardly extending intake duct 19 divides the flow, so that a part passes to injector stage 20 and the rest flows via an annular fluid flow passageway 19a to the thrust nozzles 3. The fluid flow passing through the annular injector stage 9 flows via an air intake flow passageway 23 as a so-called balance flow moving downstream to the injector stage 20.

A concentric duct 24 extends rearwardly from the injector stage 20 and divides the flow into two again. This serves two functions. It forms a radially outer annular fluid flow passageway 26 to the rear thrust nozzles 4 and a radially inner, so-called excess flow discharge duct 27 to dump excess flow, as will be described in more detail below.

Both injector stages 9 and 20 extend across the whole of the flow cross-section of the duct in which they are respectively located. They respectively include primary input flow ports 28 and 29 located within respective mounting pads 30 and 31.

Both pairs of vectorable thrust nozzles 3 and 4 are rotatably mounted with respect to the respective body portion 8, 22 by means of co-operating annular flange assemblies 32 and 33, respectively, each incorporating a worm-and-wheel mechanism (not shown) by which means simulated thrust vectoring at selected flight mode settings may be achieved. Exhaust nozzle areas and geometries are accurately reproduced to model scale.

FIG. 2 shows an alternative embodiment of the invention in which a powerplant simulator 34 according to the invention has a representative main body 35 communicating with a forward pair of vectorable nozzles 36 and, via a longitudinal duct 37, with a single vectorable nozzle 38. As in the FIG. 1 embodiment, the nozzles are arranged to give simulated thrust vectoring at selected flight mode settings.

The main body 35 includes a forward assembly 39 and a rear assembly 40, a first primary injector stage 41, a representative engine casing 42 which includes an air intake duct 43 extending rearwardly from an air intake opening 44 for secondary flow and an annular excess flow discharge duct 45. The rear assembly 40 includes a concentric inner flow-dividing duct 46 defining a radially outer annular fluid flow passageway 47 and a radially inner flow passage 54. At the forward end of duct 46 and a second primary injection stage 48 extends across the flow cross-section. The passageway 47 terminates at its rear end in nozzle attachment ducts 49.

A third annular primary injector stage 50 extends across the hole of the flow cross-section of duct 46 at the forward end of the latter. Its rear end is connected with the duct 37. Drive gas for the injectors 41, 48 and 50 is fed from a source (not shown) via inlet ports 51, 52 and 53, respectively.

The powerplant simulator according to FIG. 1 or FIG. 2 is installed within the aircraft model to be tested, the model being supported within the wind tunnel in normal flying attitude. The powerplant simulator is linked up via the respective inlet ports to a supply of drive gas which may be air, nitrogen or other gas with similar thermodynamic properties.

Test time in the tunnel is a function of the available mass flow.

In operation, the employment of multiple annular primary injector nozzle stages achieves complete mixing of the primary and secondary flows in an acceptable length, the primary flow through the first injector nozzle stage 7 or 41 inducing secondary flow through the air intake opening 13 or 44. In order to simulate exact intake flow the simulator generates an excess internal flow over requirements and excess flows are dumped through the discharge duct 27 or 45. Primary injector flow from the second and third injector nozzle stages 9, 48 or 20, 50, respectively, induces residual intake flow into the respective flow passages 19a, 26 or 47 and 45, subsequent mixing of the induced and primary flows achieving the correct exhaust pressure at the thrust nozzles 3 and 4; 36 and 38, respectively. Thus the intake mass flow and exhaust nozzle pressure ratio requirements are readily satisfied and the correct scaled intake and nozzle areas are readily reproduced. The use of a plurality of effectively series-connected primary injectors passing primary drive gas at controlled or controllable pressures and mass flows into a secondary mixing duct to achieve a desired final pressure ratio at a given exhaust nozzle is considered to be an advantageous simplification over the known powerplant simulators.

It is considered that an excess internal flow is important if exact intake flow simulation and consequently correspondingly exact jet pressures are to be achieved.

The sources of primary gas for the respective injector stages may be mutually independent, or they may be connected to a common source in which case they may be throttled or otherwise adjusted to different pressures.

What is claimed is:

1. A gas turbine powerplant simulator comprising an engine body having a fluid flow intake means connected for fluid flow with at least one exhaust nozzle by way of a duct;
   a first injector stage for injecting primary gas from a primary gas source into said duct so as to induce a flow of secondary gas or air from said intake means into said duct to mix with said primary gas; and
   at least one second injector stage connected to said duct at a position intermediate the first stage and said at least one exhaust nozzle for injecting primary gas from a primary gas source into said duct;
   wherein the said gas sources are mutually independent of one another.

2. A simulator according to claim 1, wherein the second injector stage is effective to inject primary gas across the whole flow cross-section of said duct.

3. A gas turbine powerplant simulator comprising an engine body having a fluid flow intake means connected for fluid flow with at least one exhaust nozzle by way of a duct;
   a first injector stage for injecting primary gas from a primary gas source into said duct so as to induce a flow of secondary gas or air from said intake means into said duct to mix with said primary gas; and
   at least one second injector stage connected to said duct at a position intermediate the first stage and said at least one exhaust nozzle for injecting primary gas from a primary gas source ito said duct;
   wherein the second injector stage is effective to inject primary gas across the whole flow cross-section of said duct.

4. A gas turbine powerplant simulator according to claim 1 or claim 3, wherein said duct includes flow-dividing means for dividing the flow of fluid into an excess flow discharge duct, and a balance flow duct which communicates via a said second injector stage with a said exhaust nozzle.

5. A simulator according to claim 1 or claim 3, wherein there are at least two pairs of vectorable exhaust nozzles spaced apart aong the direction of flow, and there are at least three of said second injector stages; and wherein the said flow dividing means is located at the second injector stage adjacent the most downstream of said pairs of exhaust nozzles.

6. A simulator according to claim 1 or claim 3, wherein there is a pair of vectorable exhaust nozzles and a single vectorable exhaust nozzle downstream of said pair; and wherein the said flow dividing means is located between the first injector stage and the, or the adjacent, second injector stage.

* * * * *